US008195384B1

(12) United States Patent
Billman

(10) Patent No.: US 8,195,384 B1
(45) Date of Patent: Jun. 5, 2012

(54) SYSTEMS AND METHODS FOR A SOCIAL NETWORK FOR ROADSIDE ASSISTANCE

(75) Inventor: Bradly Jay Billman, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 852 days.

(21) Appl. No.: 12/244,224

(22) Filed: Oct. 2, 2008

(51) Int. Cl.
*G01C 21/00* (2006.01)
*H04M 1/66* (2006.01)

(52) U.S. Cl. ........................................ 701/207; 455/411

(58) Field of Classification Search .................. 455/411, 455/404.2, 404.1, 414.2, 415; 705/75, 72, 705/62, 317; 701/207
See application file for complete search history.

(56) References Cited

U.S. PATENT DOCUMENTS

| 6,973,298 | B2 | 12/2005 | Chang et al. | |
|---|---|---|---|---|
| 7,359,894 | B1 | 4/2008 | Liebman et al. | |
| 7,848,765 | B2 * | 12/2010 | Phillips et al. | 455/456.3 |
| 2002/0116466 | A1 | 8/2002 | Trevithick et al. | |
| 2003/0050977 | A1 | 3/2003 | Puthenkulam et al. | |
| 2004/0184593 | A1 | 9/2004 | Elsey et al. | |
| 2005/0176403 | A1 * | 8/2005 | Lalos | 455/404.1 |
| 2007/0041531 | A1 | 2/2007 | Pines et al. | |
| 2007/0072623 | A1 | 3/2007 | Shyr et al. | |
| 2007/0244633 | A1 * | 10/2007 | Phillips et al. | 701/207 |
| 2009/0041227 | A1 | 2/2009 | Altberg et al. | |
| 2009/0093236 | A1 | 4/2009 | Balan et al. | |

OTHER PUBLICATIONS

"Location-based services: Amplifying ARPU for carriers", SiRF, 3 pages.
Gilmartin, Dan: "Where TM Now available for Nokia Nseries Smartphones", uLocate Communications, Inc., 2008, 3 pages.

* cited by examiner

*Primary Examiner* — James Trammell
*Assistant Examiner* — Muhammad Shafi
(74) *Attorney, Agent, or Firm* — Brooks, Cameron & Heubsch, PLLC

(57) ABSTRACT

A system for facilitating assistance requests may comprise at least one subsystem that receives an assistance request from a requester, at least one subsystem that identifies a current location of the requester, and at least one subsystem that identifies members of an assistance network that are within a particular area relative to the current location of the requester.

21 Claims, 7 Drawing Sheets

SYSTEMS AND METHODS FOR A SOCIAL NETWORK FOR ROADSIDE ASSISTANCE

CROSS REFERENCE TO RELATED APPLICATIONS

The patent applications below (including the present patent application) are filed concurrently and share a common title and disclosure, each of which is hereby incorporated herein by reference in its entirety:
U.S. patent application Ser. No. 12/244,200; and
U.S. patent application Ser. No. 12/244,212.

BACKGROUND

Social networks on the Internet are becoming increasingly common as a way to keep in touch and up to date on family and friends. However, members of various social networks may also on occasion need assistance from their friends, family or other trusted people in their social network(s). For example, they may have automobile failures that leave them stranded on the road. This leads to frustration and a feeling of helplessness especially where being alone is involved.

In this regard, there is a need for systems and methods that overcome shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for a social network for roadside assistance is provided. For several embodiments, a system for facilitating assistance requests may comprise at least one subsystem that receives an assistance request from a requester, at least one subsystem that identifies a current location of the requester, and at least one subsystem that identifies members of an assistance network that are within a particular area relative to the current location of the requester.

Other advantages and features of the invention are described below.

BRIEF DESCRIPTION OF THE DRAWINGS

Systems and methods for a social network for roadside assistance are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
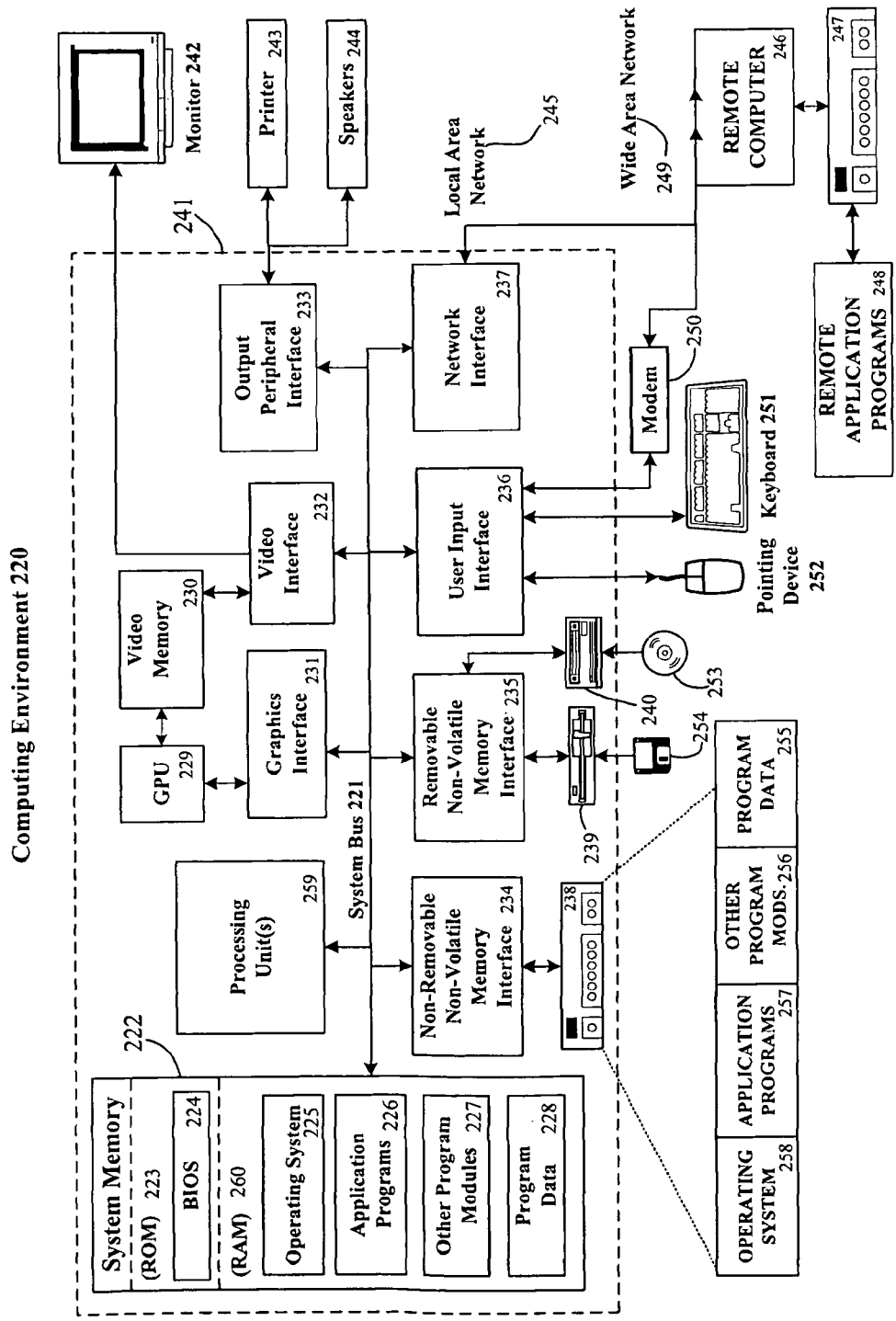
FIG. 1 is a block diagram representing an exemplary computing device suitable for use in conjunction with implementing a social network for roadside assistance.

Referring to FIG. 1, shown is a block diagram representing an exemplary computing device suitable for use in conjunction with implementing the processes described below. For example, the computer executable instructions that carry out the processes and methods for a social network for roadside assistance may reside and/or be executed in such a computing environment as shown in FIG. 1. The computing system environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary operating environment 220. For example a computer game console may also include those items such as those described below for use in conjunction with implementing the processes described below.

Aspects of the embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
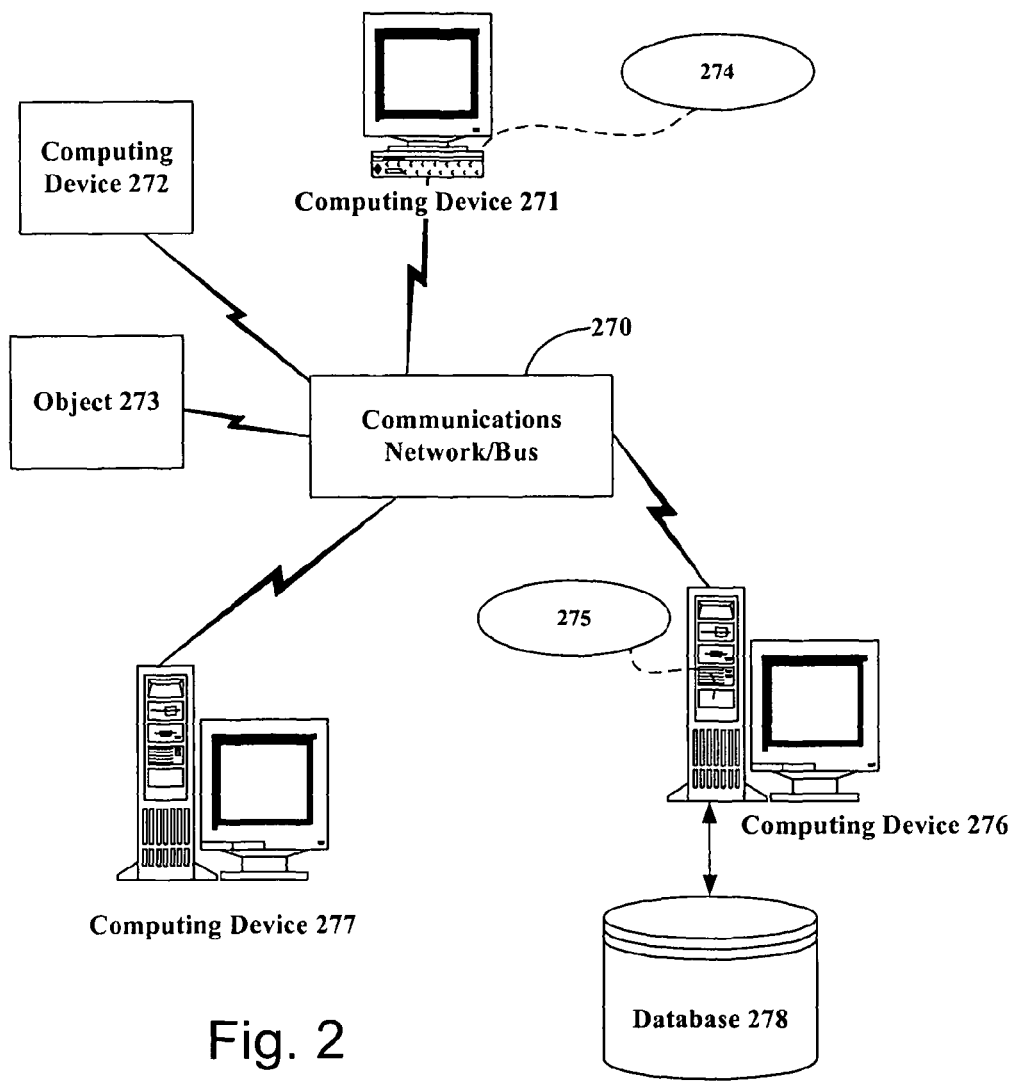
FIG. 2 illustrates an exemplary networked computing environment in which many computerized processes may be implemented to provide a social network for roadside assistance.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing a social network for roadside assistance. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
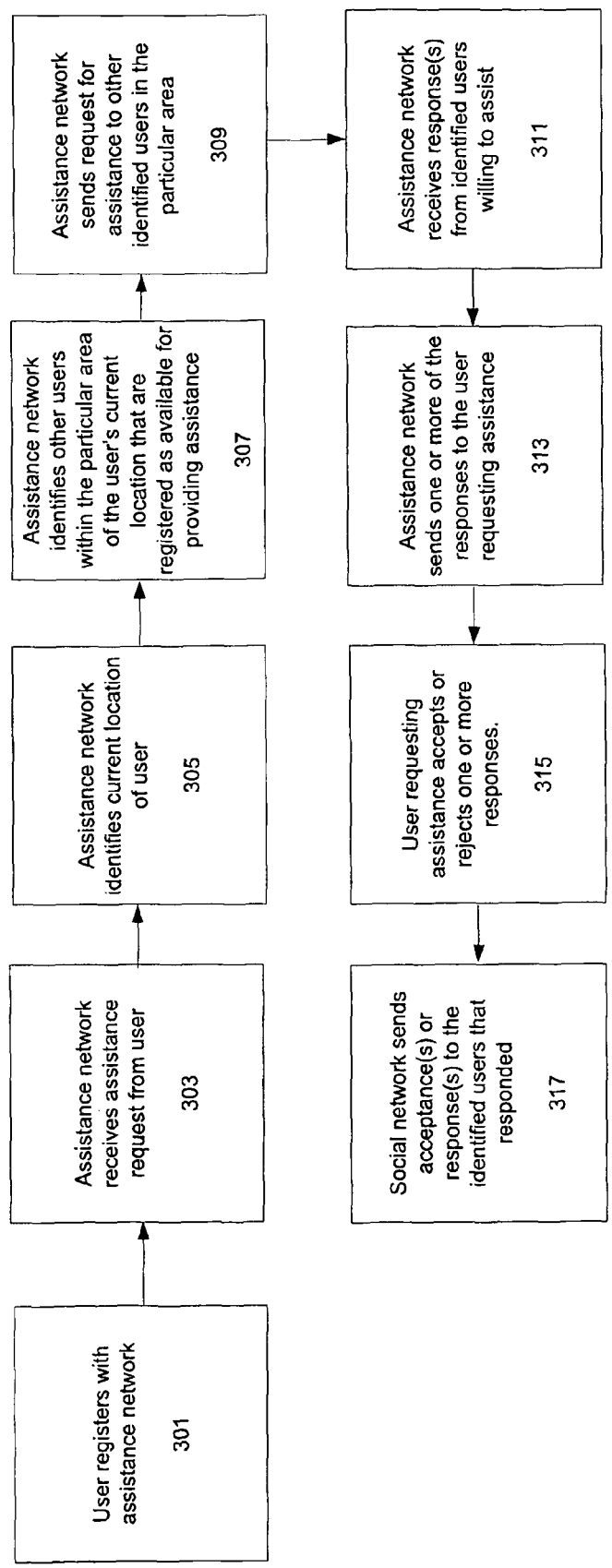
FIG. 3 is a flow chart illustrating an example process for using a social network for roadside assistance.

Referring next to FIG. 3, shown is a flow chart illustrating an example process for using a social network for roadside assistance. A user may register (301) electronically with an assistance network providing relevant information to identify the user. The user may register as a person who may potentially want assistance in the future (i.e., assistance requester), as a user who is available to offer assistance, or both. In the case where the user registers as an assistance requester, the user may provide information to identify their mobile device such as a phone number, network address, hardware address, etc. Also, this information may be gleaned from a signal received originating from the mobile device of the user. Also, users may provide personal and user information and also selection criteria regarding other users in the network to whom or from whom they would like to provide or receive assistance.

The assistance network may comprise of a database of registered users (stored locally on a user's mobile device, remotely or both) managed by a service comprising remote application servers, local application(s) on a user's mobile device or a combination of both. The assistance network may receive (303) an assistance request from a user registered with the assistance network. For example, a user may be traveling in their automobile and break down along the road. The user may then send a request for assistance to the assistance network via their mobile device (e.g., their cell phone) or land line telephone. The request may be made over any number of wired or wireless communication channels, for example, including, but not limited to: cellular, satellite, wireless fidelity (WiFi), etc. For example, a user may send a short message service (SMS) text message to the assistance network requesting assistance. In the case of using a land line telephone, there may a phone number provided that the user may call to provide the request for assistance and location information. The request for assistance may include relevant information in order to properly assist the requester. For example, the request may include, but is not limited to, the following types of information: identification information regarding the requester, identification information regarding the requester's mobile device, current location information of the user, type of problem for which the requester is requesting assistance, severity of problem for which the requester is requesting assistance, details regarding problem for which the requester is requesting assistance, selection criteria regarding from whom the requester desires assistance, time period to wait for responses, etc. Except for current location information and problem specific information, at least some of the foregoing information may have been previously input and stored in the assistance network and automatically obtained by the assistance network once the request is received.

If not received in the request, the assistance network may then identify the current location of the user requesting assistance. This may be accomplished using any number of methods including but not limited to using satellite 411 global positioning system (GPS) subsystems and signals, cell tower triangulation subsystems and signals, or other suitable tracking/location systems that are able to provide data on the location of the mobile device of the user.

The assistance network then identifies (307) other users within a particular area of the requester's current location that are registered as available for providing assistance. These other users' locations may have been provided by the other users when they registered with the assistance network, for example. The size and shape of the particular area surrounding the requester's current location may be determined by any number of factors including, but not limited to, one or more of the following: a radius of a selected distance surrounding the requester's current location, the closest major highway or freeway to the requestor's current location, the closest major city to the requester's current location, etc.

The assistance network then sends 309 a request for assistance to the other identified users in the particular area. In this way, the requester only need send one request and can avoid having to send separate requests for assistance to each user in the particular area. This request for assistance sent to the other users in the area may be over any number of communication channels including, but not limited to, wired and wireless communication channels and over the Internet. The assistance network then waits for and may receive (311) one or more response(s) from identified users willing to assist. The time period to wait for responses may vary and may be set by the requester, assistance network, or other administrator, etc. Also, the response(s) may be communicated over any number of channels including, but not limited to, wired and wireless communication channels and over the Internet.

If one or more responses are received, the assistance network sends 313 one or more of the responses to the user requesting assistance. These responses may also be sent over any number of channels including, but not limited to, wired and wireless communication channels and over the Internet. The user requesting assistance then may accept 315 or reject one or more of the responses. This acceptance is made by communicating the acceptance to the assistance network which may then sends 317 the acceptance(s) or rejections(s) to the identified users that responded. The acceptances or rejections may also include information regarding other users in the particular area that offered assistance, whose offers were accepted, and whose were rejected, etc. Additionally, after the assistance is rendered a user may rate or provide feedback information to the assistance network regarding a user who rendered assistance. This information may be made available to other users or members of the assistance network.

Figure 4:
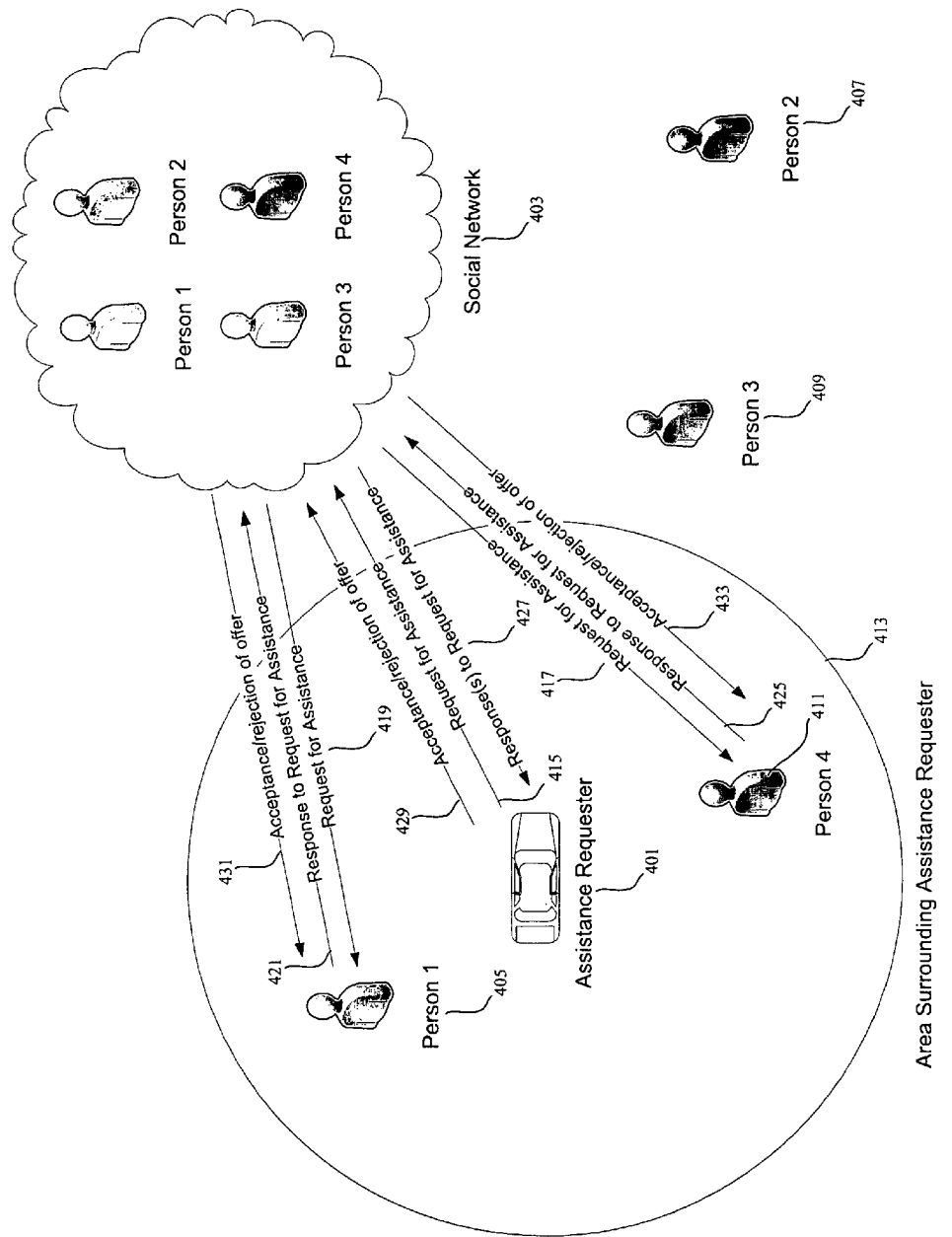
FIG. 4 is a block diagram illustrating an example system for a social network for roadside assistance.

Referring next to FIG. 4, shown is a diagram illustrating an example system for a social network for roadside assistance. Shown is an example assistance requester 401, an example social network (i.e., assistance network) 403, example people registered with the assistance network 405 407 409 411, and an example particular area 413 surrounding the current location of the assistance requester. For example, the requester may send a request for assistance 415 to the assistance network 403 via their mobile device. The assistance network then identifies the current location of the requester 401 (via, GPS signal for example) and identifies registered person 1 405 and registered person 4 411 as being within the particular area 413 surrounding the requester 401. The assistance network then sends requests for assistance 417 419 to both person 1 405 and person 4 411 including perhaps the current location of the requester and/or how far the requester is from the person receiving the request (e.g., person 1 405 or person 4 411) and waits for a response from either of them. For example, both person 1 405 and person 4 411 send responses 421 425 to the assistance network 403 and these responses 427 are then sent to the requester in a consolidated manner or individually. The requester may then send an indication 429 of acceptance or rejection of each offer. The applicable acceptance or rejection 431 may then be sent to person 1 405 and person 4 411 so that they know whether to go to the location of the requester 401 to render assistance.

Figure 5:
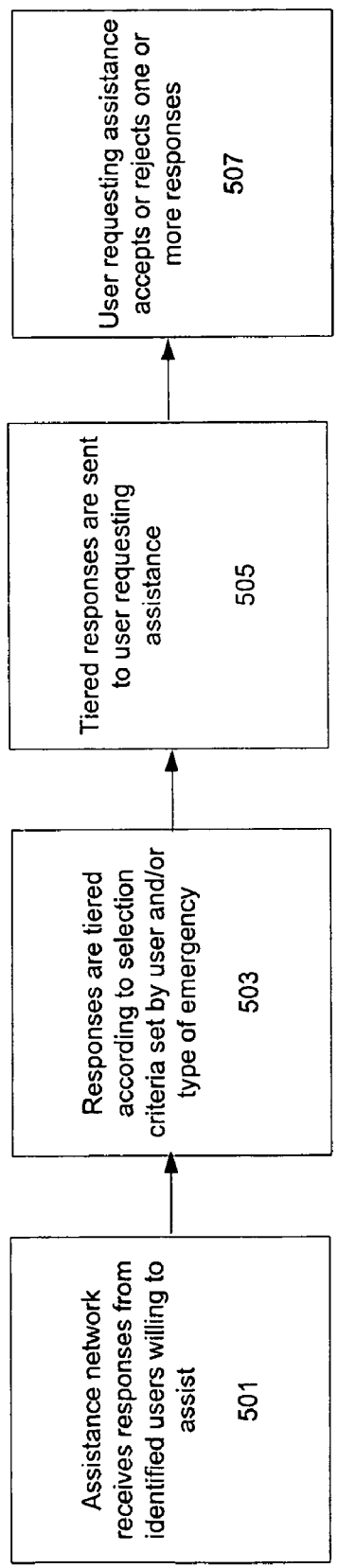
FIG. 5 is a flow chart illustrating an example process for providing tiered responses to a request for assistance within a social network for roadside assistance.

Referring next to FIG. 5 shown is a flow chart illustrating an example process for providing tiered responses to a request for assistance within a social network for roadside assistance. The assistance network receives (501) responses as described earlier from identified users willing to assist. The responses are then tiered (503) according to selection criteria previously set by user and/or type of emergency. For example, the requester may prefer to have assistance provided by a user of a certain gender or age if available, in which case responses of users fitting that criteria are provided to the requester with an indication that those responses fit the preferred criteria (e.g., that the user fits as a first-tier choice for the requester). The user may select multiple tiers of preferences, for example, with tier 1 being users that fit 100% percent of the selection criteria, tier 2 being users that fit 50% of the selection criteria and so on. Also, the requester may indicate criteria specific tiers, such as, for example, users having fitting criteria A and B go into tier 1, if not fitting criteria A and B, but fitting criteria C, then the user goes into tier 2, and so on.

The tiered responses are then sent (505) to the user requesting assistance either individually or in a consolidated manner after waiting a particular period of time. Also, at the discretion of the requester, responses that do not meet certain criteria may not be sent at all to the requester. The user requesting assistance may then accept or reject (507) one or more of the tiered responses.

Figure 6:
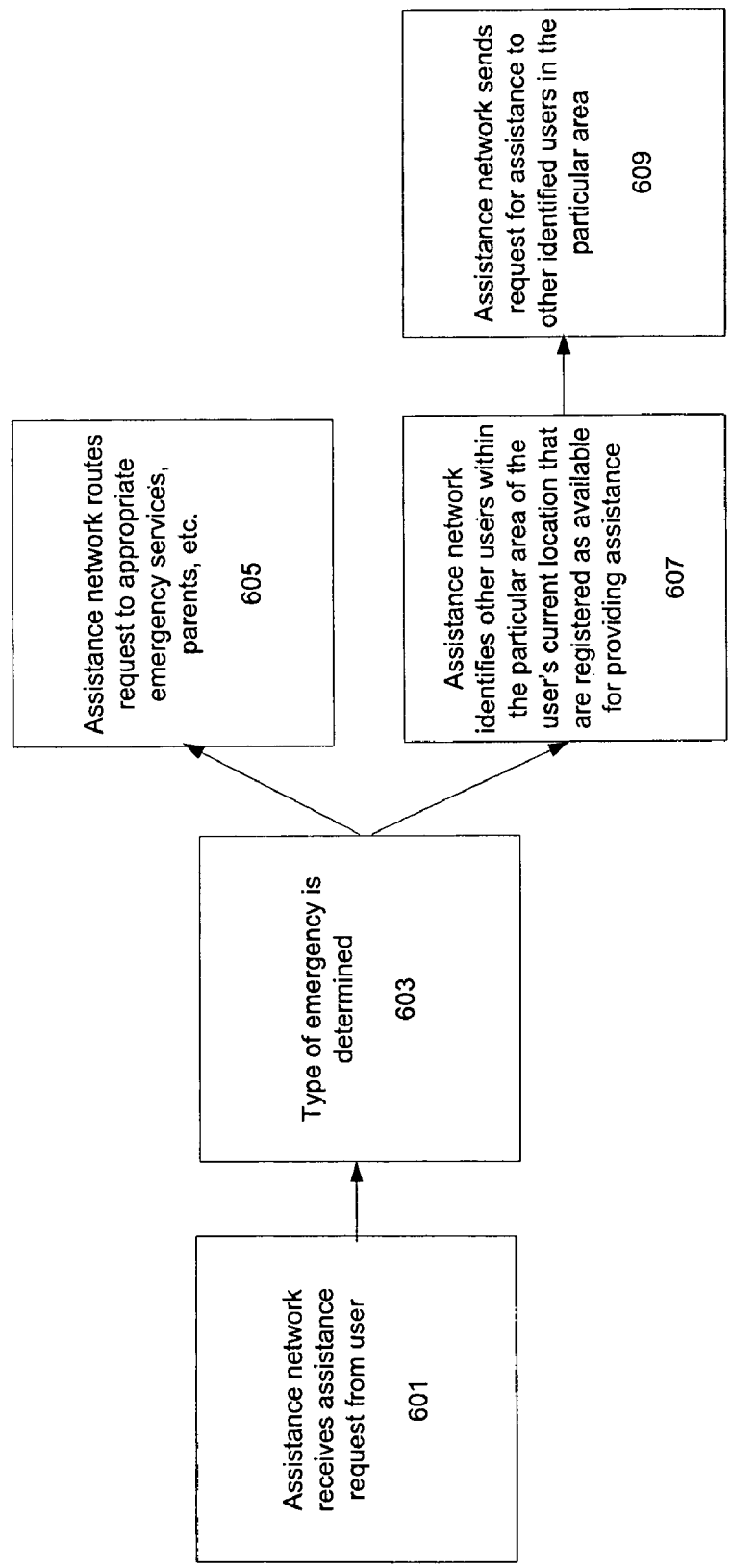
FIG. 6 is a flow chart illustrating an example process for routing requests for assistance within a social network for roadside assistance.

Referring next to FIG. 6 shown is a flow chart illustrating an example process for routing requests for assistance within a social network for roadside assistance. The assistance network receives (601) an assistance request from a user and then the type of emergency is determined (603) by the assistance network. The type of emergency may be determined (603), for example, by information provided by the requester in the request for assistance. The assistance network may then route (605) the request to appropriate emergency services, parents, etc. For example, if the request for assistance is due to an automobile accident, a request for assistance may be routed to the police. This request for assistance may be automated and made through any number of communication channels to different emergency services including use of 911 emergency hotline systems. As another example, if the requester is a minor, their parents may be notified according to previous settings or preference selections made by the minor's parents within the assistance network. In addition, the assistance network may also identify (607) other users within the particular area of the user's current location that are registered as available for providing assistance and send (609) requests for assistance to those other identified users in the particular area.

Figure 7:
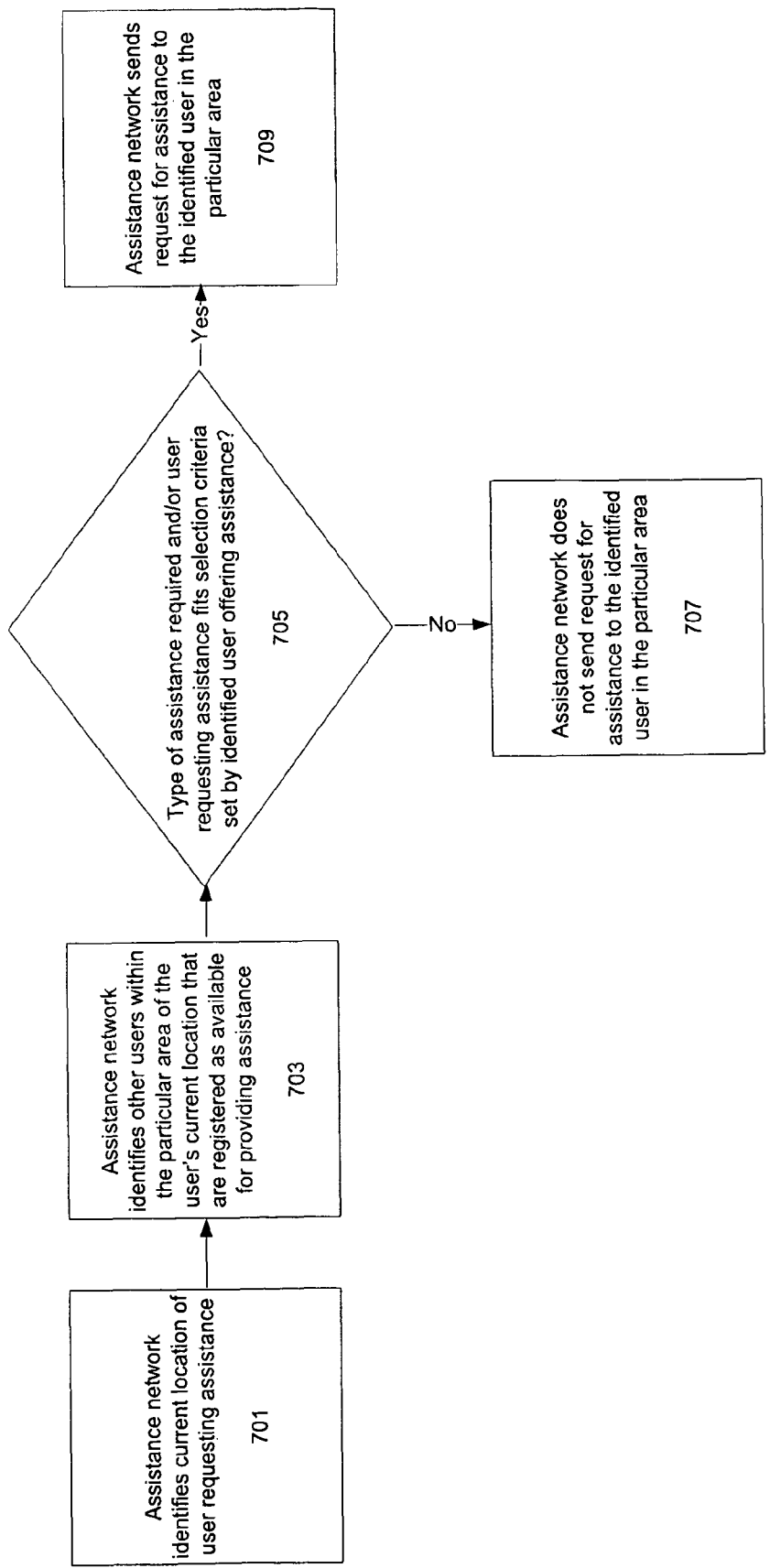
FIG. 7 is a flow chart illustrating an example process for sending requests for assistance to users within a social network for roadside assistance.

Referring next to FIG. 7 shown is a flow chart illustrating an example process for sending requests for assistance to users within a social network for roadside assistance. As described above, the assistance network identifies (701) the current location of a user requesting assistance and the assistance network identifies (703) other users within the particular area of the user's current location that are registered as available for providing assistance. A determination is then made (705) whether the type of assistance required and/or user requesting assistance fits selection criteria set by the identified user offering assistance. For example, the identified user offering assistance may have previously set criteria within the assistance network that they are only interested in providing assistance to user's that have run out of gas or need a tire changed, other user's may have set criteria that they can assist with engine problems, etc., or if the assistance network includes military members, a user may have set criteria that they only are interested in providing assistance to those having a certain rank, or only those that are officers, or only those that are enlisted, etc. Any number of criteria may be selected and is not limited to the examples provided herein.

If the type of assistance required and/or user requesting assistance fits selection criteria set by the identified user offering assistance, then the assistance network sends 709 a request for assistance to the identified user in the particular area. Otherwise, then the assistance network does not send 707 a request for assistance to the identified user in the particular area.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A system for facilitating assistance requests comprising:
   at least one subsystem that determines a current location of a requester requesting assistance;
   at least one subsystem that identifies other users within a particular area of the requester's current location that are registered in an assistance network as available for providing assistance;
   at least one subsystem that determines whether a request from the requester fits selection criteria set by a number of identified users offering assistance;
   at least one subsystem that determines a tiered list of the number of identified users that fit the selection criteria; and
   at least one subsystem that presents the tiered list to the requester.

2. The system of claim 1 wherein the selection criteria is regarding one or more of the following: characteristics of the requester, characteristics of assistance requested by the requester.

3. The system of claim 2 wherein the characteristics of assistance requested by the requester comprise one or more of the following: automobile mechanical trouble, locked keys in automobile, ran out of gas, flat tire, auto accident, injury, need directions, lost.

4. The system of claim 2 wherein the characteristics of the requester comprise one or more of the following: age, gender, military rank, distance from the identified user offering assistance.

5. The system of claim 1 further comprising at least one subsystem that sends the request to the identified user offering assistance only if the request from the requester fits selection criteria set by the identified user offering assistance.

6. The system of claim 1 further comprising at least one subsystem that sends the request to appropriate emergency services if the request fits selection criteria regarding a type of assistance requested.

7. The system of claim 6 wherein the selection criteria regarding a type of assistance requested comprises the request being the result of an automobile accident.

8. A method for facilitating assistance requests comprising:
  executing, by a processor, computer readable instructions for:
    determining a current location of a requester requesting assistance;
    identifying other users within a particular area of the requester's current location that are registered in an assistance network as available for providing assistance;
    determining whether a request from the requester fits selection criteria set by a number of identified users offering assistance
    determining a tiered list of the number of identified users that fit the selection criteria; and
    presenting the tiered list to the requester.

9. The method of claim 8 wherein the selection criteria is regarding one or more of the following: characteristics of the requester, characteristics of assistance requested by the requester.

10. The method of claim 9 wherein the characteristics of assistance requested by the requester comprise one or more of the following: automobile mechanical trouble, locked keys in automobile, ran out of gas, flat tire, auto accident, injury, need directions, lost.

11. The method of claim 9 wherein the characteristics of the requester comprise one or more of the following: age, gender, military rank, distance from the identified user offering assistance.

12. The method of claim 8 further comprising sending the request to the identified user offering assistance only if the request from the requester fits selection criteria set by the identified user offering assistance.

13. The method of claim 8 further comprising sending the request to appropriate emergency services if the request fits selection criteria regarding a type of assistance requested.

14. The method of claim 13 wherein the selection criteria regarding a type of assistance requested comprises the request being the result of an automobile accident.

15. A non-transitory computer readable medium for facilitating assistance requests comprising computer readable instructions for:
  determining a current location of a requester requesting assistance;
  identifying other users within a particular area of the requester's current location that are registered in an assistance network as available for providing assistance;
  determining whether a request from the requester fits selection criteria set by a number of identified users offering assistance;
  determining a tiered list of the number of identified users that fit the selection criteria; and
  presenting the tiered list to the requester.

16. The computer readable medium of claim 15 wherein the selection criteria is regarding one or more of the following: characteristics of the requester, characteristics of assistance requested by the requester.

17. The computer readable medium of claim 16 wherein the characteristics of assistance requested by the requester comprise one or more of the following: automobile mechanical trouble, locked keys in automobile, ran out of gas, flat tire, auto accident, injury, need directions, lost.

18. The computer readable medium of claim 16 wherein the characteristics of the requester comprise one or more of the following: age, gender, military rank, distance from the identified user offering assistance.

19. The computer readable medium of claim 15 further comprising computer readable instructions for sending the request to the identified user offering assistance only if the request from the requester fits selection criteria set by the identified user offering assistance.

20. The computer readable medium of claim 15 further comprising computer readable instructions for sending the request to appropriate emergency services if the request fits selection criteria regarding a type of assistance requested.

21. The computer readable medium of claim 15 wherein the selection criteria regarding a type of assistance requested comprises the request being the result of an automobile accident.

* * * * *